United States Patent
Andersson

(10) Patent No.: US 9,845,821 B2
(45) Date of Patent: Dec. 19, 2017

(54) FASTENING ELEMENT AND FASTENING ASSEMBLY

(71) Applicant: Nord-Lock AB, Mattmar (SE)

(72) Inventor: Mattias Andersson, Ostersund (SE)

(73) Assignee: Nord-Lock AB, Mattmar (SE)

( * ) Notice: Subject to any disclaimer, the term of this patent is extended or adjusted under 35 U.S.C. 154(b) by 0 days.

(21) Appl. No.: 14/902,311

(22) PCT Filed: Jul. 1, 2014

(86) PCT No.: PCT/SE2014/050823
§ 371 (c)(1),
(2) Date: Dec. 30, 2015

(87) PCT Pub. No.: WO2015/002598
PCT Pub. Date: Jan. 8, 2015

(65) Prior Publication Data
US 2016/0146242 A1    May 26, 2016

(30) Foreign Application Priority Data
Jul. 1, 2013  (SE) ..................... 1350810

(51) Int. Cl.
*F16B 39/282* (2006.01)
*F16B 39/24* (2006.01)
(Continued)

(52) U.S. Cl.
CPC ............ *F16B 39/282* (2013.01); *F16B 39/24* (2013.01); *F16B 43/00* (2013.01); *F16B 2001/0092* (2013.01)

(58) Field of Classification Search
CPC .................. F16B 43/00; F16B 39/24
(Continued)

(56) References Cited

U.S. PATENT DOCUMENTS 2,552,004 A * 5/1951 Erdman .................. F16B 31/06
                                                          403/404
2,757,700 A * 8/1956 Uphoff .................. F16B 39/286
                                                          411/274
(Continued)

FOREIGN PATENT DOCUMENTS

CA       1171701        7/1984
CN       2323188 Y      6/1999
(Continued)

OTHER PUBLICATIONS

Office Action received in corresponding Chinese Application No. 201480037718.6 dated Nov. 28, 2016.
(Continued)

*Primary Examiner* — Gary Estremsky
(74) *Attorney, Agent, or Firm* — Knobbe, Martens, Olson & Bear, LLP

(57) ABSTRACT

A fastening assembly includes a fastening element extending along a central axis between a first and a second end. The fastening element includes a head section extending from the second end along the central axis and engageable by a tool, such as a hexagonal head. A protruding cylindrically shaped section has a smaller diameter than the head section. A flanged section is arranged between the head section and the protruding cylindrically shaped section. The fastening element on the cylindrically shaped section includes an engaging section. A first portion of the engaging section is positioned at a distance from the surface of the flanged section facing the first end, such that a locking washer will be stopped from reaching the surface of the flanged section if introduced on the cylindrically shaped section with its smaller central diameter in the direction of the engaging section.

7 Claims, 8 Drawing Sheets

Figure 1:
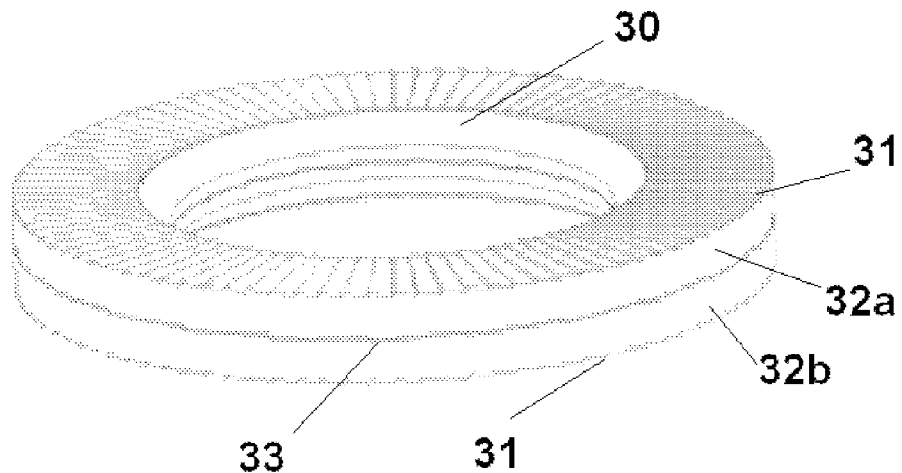

(51) Int. Cl.
*F16B 43/00* (2006.01)
*F16B 1/00* (2006.01)

(58) Field of Classification Search
USPC .............................. 411/149, 531, 424, 371.2
See application file for complete search history.

(56) References Cited

U.S. PATENT DOCUMENTS

| | | | |
|---|---|---|---|
| 3,221,792 A | | 12/1965 | Poupitch |
| 3,572,414 A | * | 3/1971 | Onufer .................... F16B 39/24 411/270 |
| 4,380,413 A | * | 4/1983 | Dewey .................... F16B 43/02 411/161 |
| 4,780,039 A | * | 10/1988 | Hartman ............... E04D 3/3603 411/369 |
| 4,934,857 A | * | 6/1990 | Swanson .................. F16B 5/02 403/28 |
| 5,213,341 A | * | 5/1993 | Griffiths .................... F16L 5/08 277/606 |
| 5,256,019 A | * | 10/1993 | Phillips, II ............ F16B 37/068 29/437 |
| 5,746,558 A | * | 5/1998 | Nygren, Jr. ............. F16B 5/025 411/110 |
| 6,146,093 A | * | 11/2000 | Lammas ................. F01D 11/00 415/160 |
| 6,817,278 B2 | * | 11/2004 | Hennemann ........ F15B 15/1447 29/888.051 |
| 2003/0077143 A1 | * | 4/2003 | Smolarek ................ F16B 39/24 411/161 |
| 2004/0009052 A1 | | 1/2004 | Jungman et al. |
| 2008/0014046 A1 | * | 1/2008 | Bauer ..................... F16B 39/24 411/164 |
| 2008/0206013 A1 | | 8/2008 | Bentrim |
| 2009/0196686 A1 | | 8/2009 | Palm |
| 2010/0047033 A1 | | 2/2010 | Baumgartner et al. |
| 2011/0002753 A1 | * | 1/2011 | Gong .................. F16B 25/0026 411/412 |
| 2013/0180096 A1 | * | 7/2013 | David ...................... F16B 5/00 29/525.01 |

FOREIGN PATENT DOCUMENTS

| | | |
|---|---|---|
| WO | WO 02/097283 A2 | 12/2002 |
| WO | WO 2008149386 | 12/2008 |
| WO | WO 2009045165 | 4/2009 |

OTHER PUBLICATIONS

Extended European Search Report received in Application No. EP 14 81 9691.8.
Office Action received in Chinese Patent Application No. 201480037718.6, dated Aug. 18, 2017.

* cited by examiner (Prior Art)

FASTENING ELEMENT AND FASTENING ASSEMBLY

FIELD OF THE INVENTION

The current patent application relates to a fastening element according to the preamble of claim 1. The current application relates to a fastening assembly according to the preamble of claim 8

BACKGROUND

Wedge locking washers have been known for a long time.

Washers for locking purposes are previously known and normally comprise a central hole for a screw shank. Generally there are many different variants of this arrangement. One particular arrangement is a locking washer comprising teeth on one side and cams on the other side. The teeth can in general be described as being, of a shape that enables them to engage with a surface of a screw head, nut or an element to be attached. One possible shape is a leaning pyramidal shape. The teeth extend radially on the locking washer surface. The other side of the known lock washers can have a cam pattern. The cam pattern in general can be described as a sloped wedge surface where the inclination angle of the cams should be larger than the pitch of the thread of the screw. The cam pattern extends radially. These locking washers are used in pairs where the pair is constituted of two equal washers, however applied such that the cams is adjacent each other and the teeth of the corresponding other side of the washers are facing away from each others. Applied in a correct manner and with the proper hardness of the elements to be attached and the washers to lock the screw joint, this configuration provides for a very safe and reliable attachment. Washers of this type is for example described in the document DE 2 413 760.

In another document US 2008/0014046 A1 is also a washer described that is intended to be used in pairs.

From the above it should be understood that the locking washer pair when separated into two separate washers can generally be applied in any configuration to a joint. Thus a stressed or in experienced user could apply cams of a first washer against the friction means, such as the teeth, of a second washer, thus depriving the joint of its wedge locking effect. In order to remedy this in general wedge locking washers can be releasably attached to each other in the correct configuration, for example by a glue. As the glue cannot fix the washers to each other completely, as the wedge locking effect is dependent on that the cams can slide against each other, it is still possible to separate the washers from each other. Thus an inexperienced user could separate the washers and apply them in the wrong configuration to the threaded fastener.

SHORT DESCRIPTION OF THE INVENTION

Thus an object of the present invention is to solve at least some of the above mentioned deficiencies with the known prior art.

Thus a solution is provided in the form of a fastening element, comprising a head section engageable by a tool, preferably being a hexagonal head, the fastening element being provided with a first end, the fastening element being provided with a second end, the first end being provided with a protruding cylindrically shaped section having a smaller diameter than the head section and a flanged section having an outer diameter that is larger than the cylindrically shaped section and the head section, wherein the flanged section has a diameter that is equal or larger than the diameter of the head section, the flanged section having a surface facing the first end and circumferential to the central axis of the fastening element, wherein the fastening element, on the cylindrically shaped section, comprises an engaging section, wherein at least a first portion of the engaging section comprises a diameter that is larger than the outer diameter of the cylindrically shaped section, wherein the diameter of the engaging section being substantially smaller than the outer diameter of the flanged section, the first portion of the engaging section being positioned at a distance from the surface of the flanged section facing the first end, such that a locking washer, provided with a first central inner diameter that is smaller at one axial end of the locking washer compared to the second inner diameter at the other axial end of the locking washer, will be stopped from reaching the surface of the flanged section, if introduced on the cylindrically shaped section with its smaller central diameter in the direction of the engaging section.

The advantage with the above solution is that the locking washers cannot be mounted wrongly. In particular it is not possible to position the first washer wrongly on the fastening element. That is with the cams of the first washer in position against the fastening elements surface on the flanged section. The engaging section will by providing a gap between the washer and the surface of the flanged element, thus drawing the attention to the user that the washer has been mounted in the wrong direction. The user will thus be prevented from tightening the joint before realising his mistake, or even worse, not realising his mistake at all.

In a further development the fastening element the engaging section is provided in the form of a circular protrusion circumferal to the cylindrically shaped section.

The advantage of this development is that the washer is engaged equally around the cylindrically shaped section.

In a further development the fastening element has the engaging section provided with an essentially flat upper surface and an essentially perpendicular surface extending to the surface of the flanged section.

The advantage of this design is that the washer when mounted wrongly will rest very firmly against the engaging section, thus a user trying to force the washer against the surface of the flanged section, cannot overcome the engaging section by force. And also the flat surface guarantees that the wrongly mounted washer will rest essentially parallel with the surface of the flanged section thus giving a homogeny formed gap giving good notice to the user.

In another embodiment the Fastening element according to claim 1 above wherein, the engaging section is provided in the form of a bevel face running circumferally around the cylindrically shaped section and extending from the surface of the flanged section to the cylindrically shaped section.

The advantage of this embodiment is that it is particularly easy to manufacture.

In another embodiment the flanged section of the fastening element is provided with cams. Thus a second locking washer need not be applied.

The fastening element according to the above can be both a nut and a screw.

The invention also concerns a Fastening assembly comprising a fastening element according to the above developments and embodiments, further comprising at least one locking washer, wherein the locking washer is provided with a first diameter at a first end surface, wherein the locking washer is provided with a second diameter at a second end surface opposite the first end surface, wherein the first diameter is smaller than the second diameter, wherein if the locking washer is applied with the first diameter facing the engaging section the locking washer is stopped from reaching the surface of the flanged section, by engagement of the end with the first diameter with the engaging section at a first portion of the engaging section.

From this it is clear that the advantage is that the fastener assembly will be applied correctly due to the interaction between the fastening element and the locking washer.

Also a part of the invention the fastening assembly wherein there is a relation between the first and second diameter of the locking washer, the thickness of the washer, the distance between the first portion of the engaging section and the surface of the flanged section, such that, when said locking washer is applied to the cylindrical section of the fastening element with the second diameter facing the surface of the flanged section, the second end surface of the washer can be positioned in parallel contact with the surface of the flanged section, thus when the washer is applied in this direction, the first portion of the engaging section has a smaller diameter than a point, in the axial direction of the washer, on the inside periphery, facing the first portion of the engaging section.

Thus when applying the washer correctly the fastener assembly will not show any gap between the first washer and the surface of the flanged section.

The fastening assembly can have two locking washers. These can be equal. It is also possible to think that the locking washers are differently constituted, wherein a first locking washer has a first and a second non equal inner diameter, wherein a second locking washer has a cylindrical inner diameter that is substantially equal to the smaller first diameter.

The advantage of this arrangement is that the second locking washer is easier to manufacture. The washers can comprise wedge locking cams on the said first end surface.

LIST OF DRAWINGS

Figure 2:
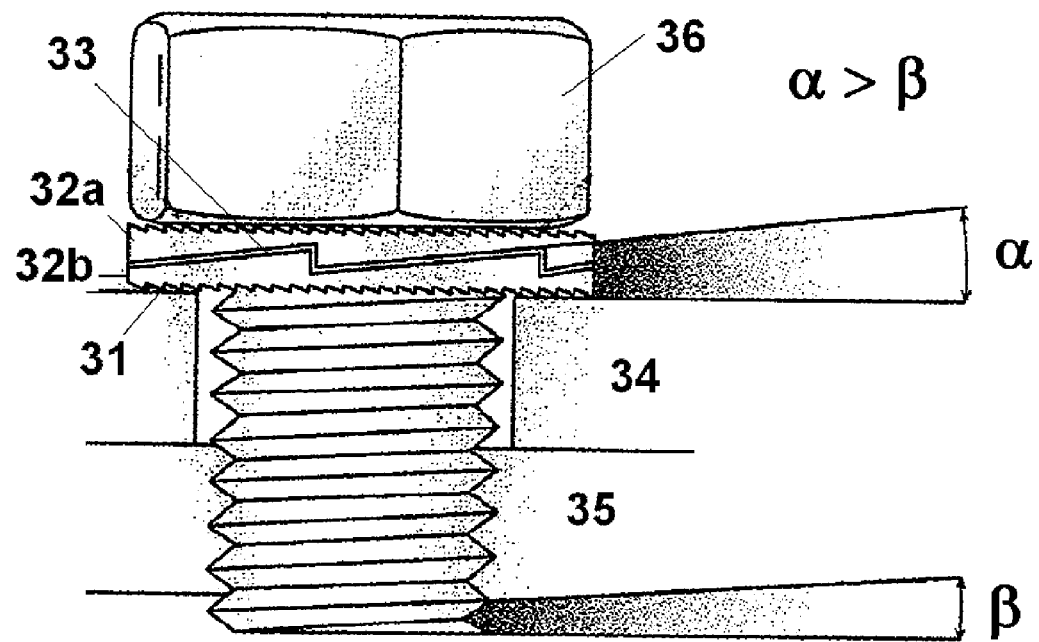
Figure 3:
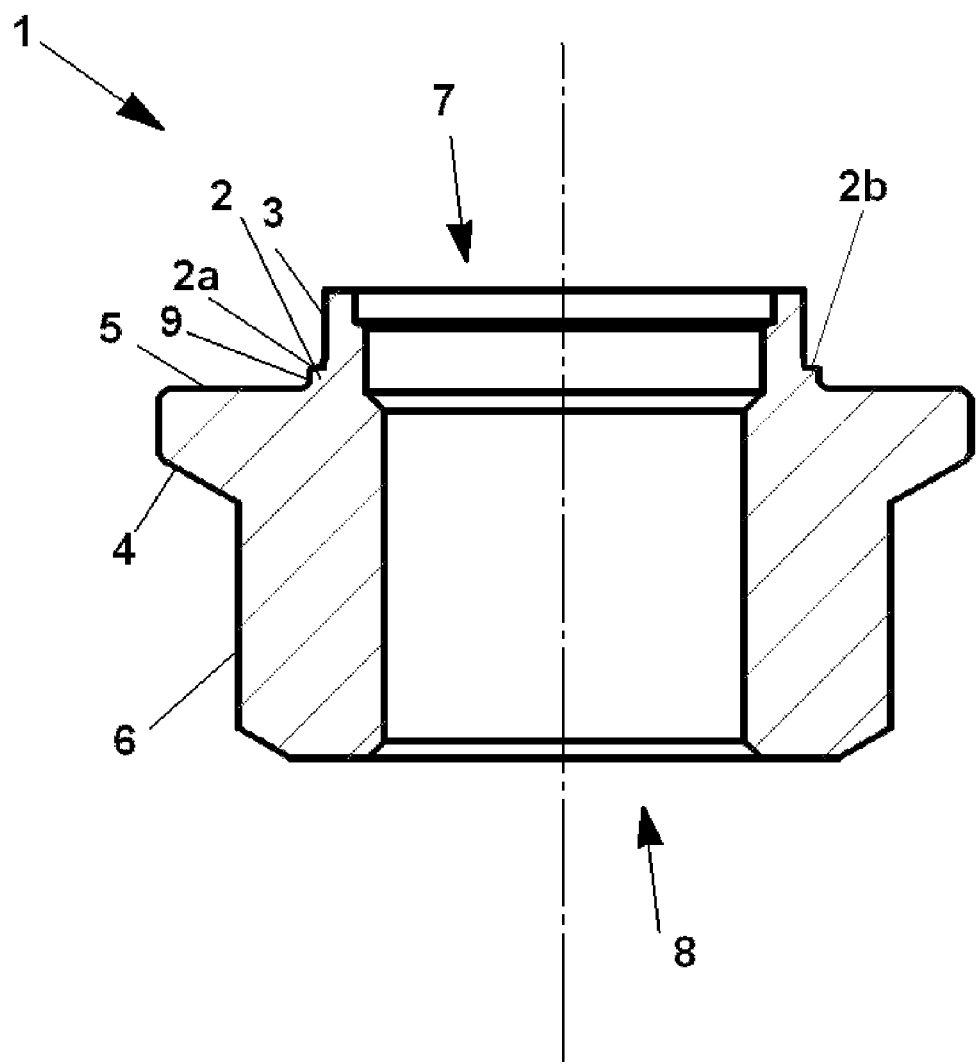
Figure 3A:
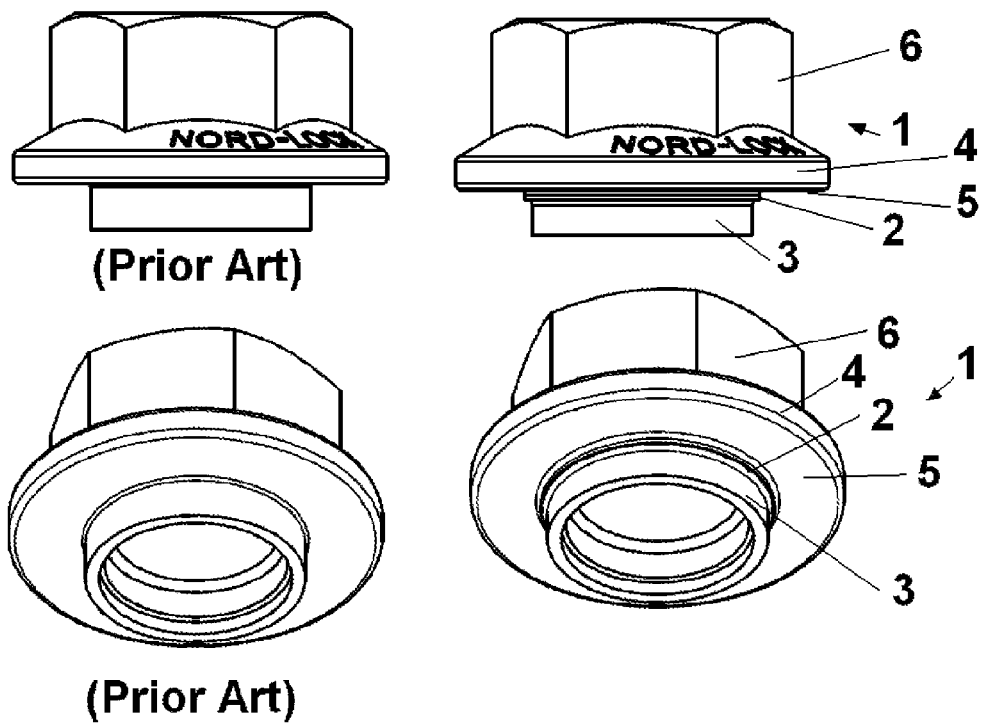
Figure 4:
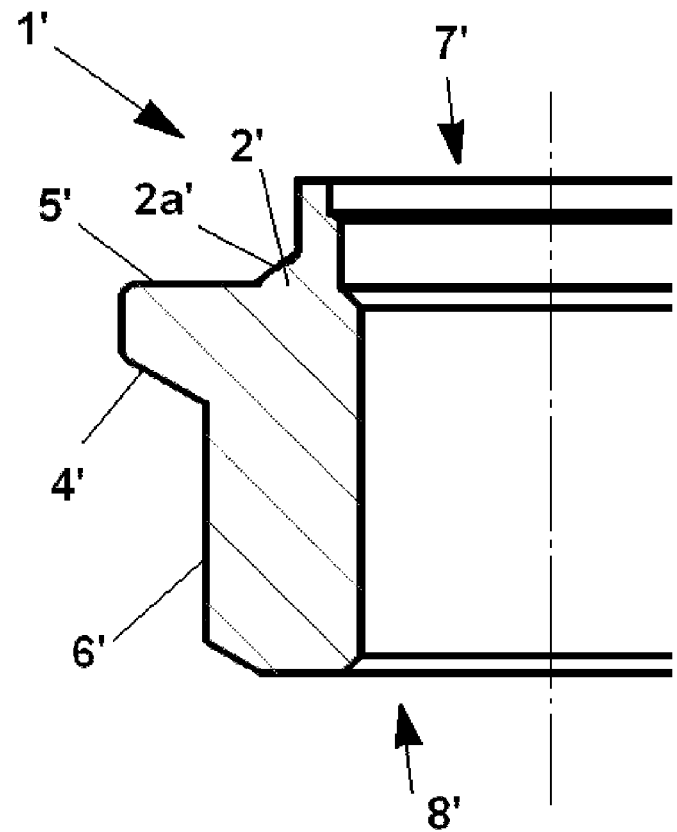
Figure 5:
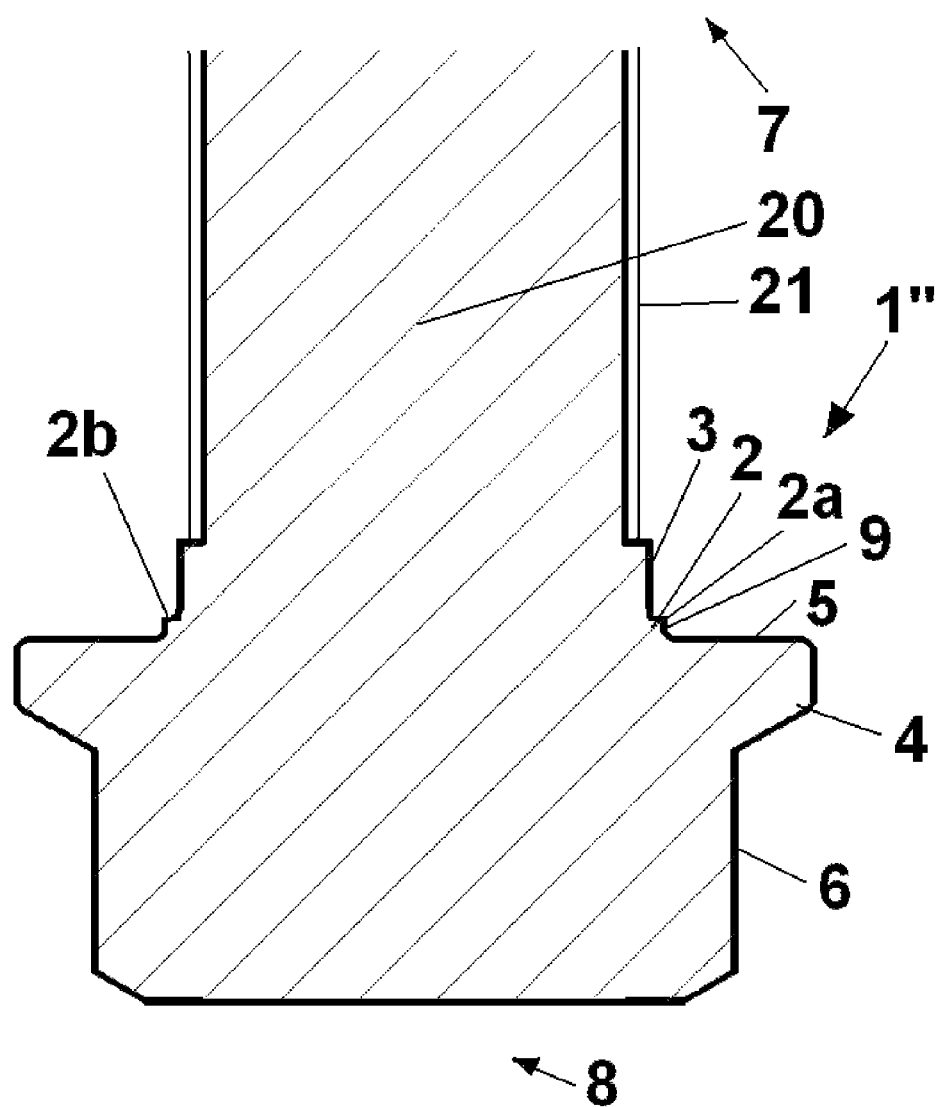
Figure 6:
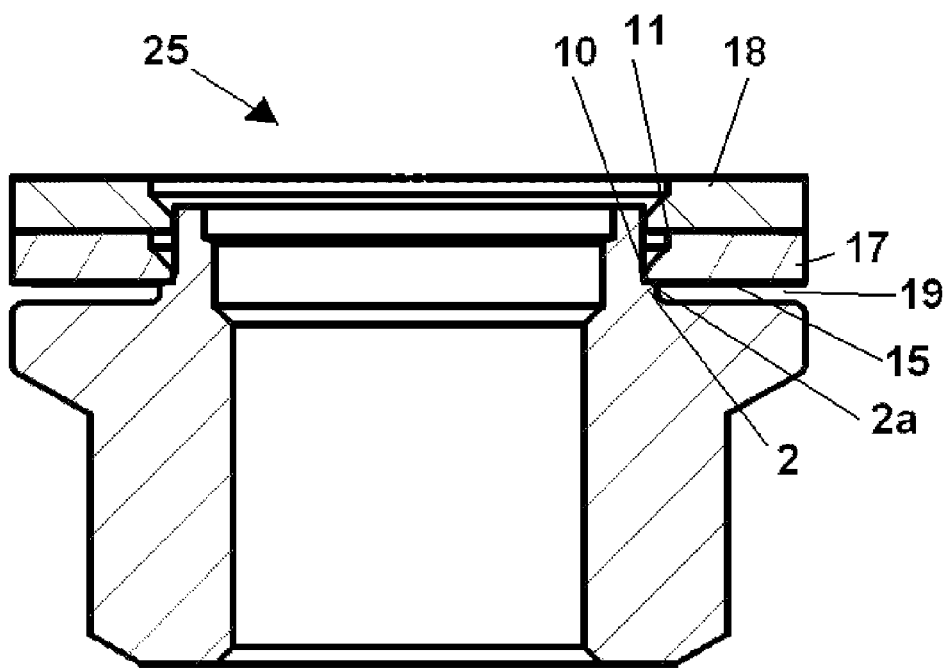
Figure 6A:
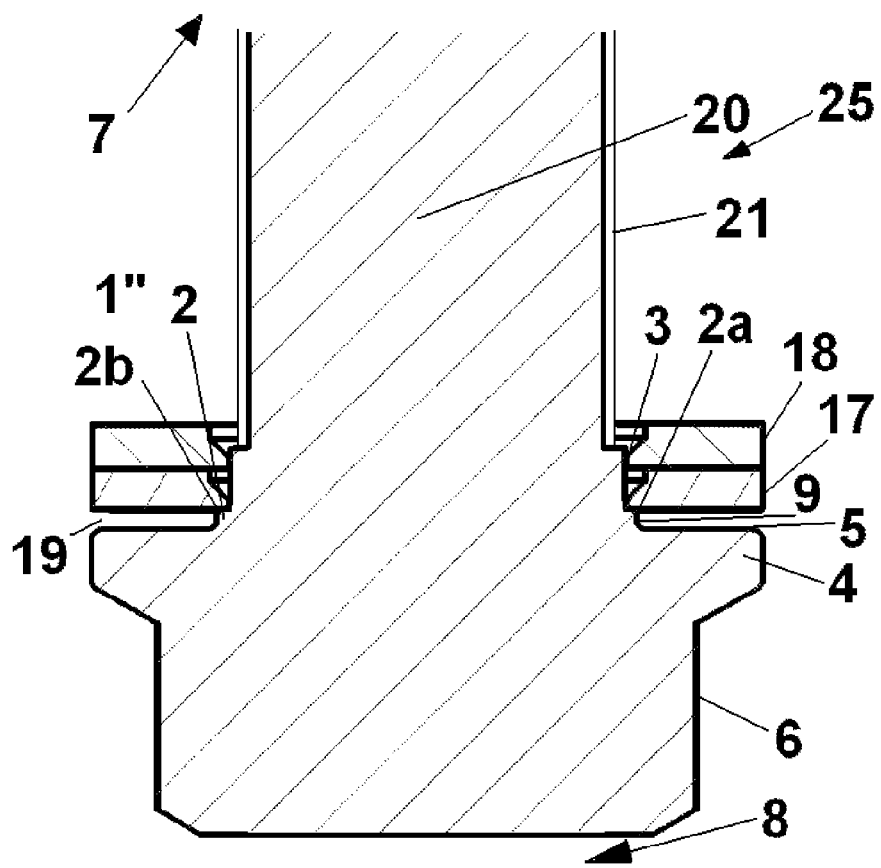

FIG. 1 discloses prior art locking washer pair.
FIG. 2 discloses prior art locking washer assembly.
FIG. 3 discloses a fastening element according to the first embodiment in the form of a nut.
FIG. 3a discloses a prior art fastening element together with a fastening element according to the first embodiment according to FIG. 3.
FIG. 4 discloses part of a fastening element according to the second embodiment in the form of a nut.
FIG. 5 discloses a fastening element according to the invention in the form of a screw.
FIG. 6 discloses a fastening assembly with a pair of wrongly attached locking washers.
FIG. 6a discloses a fastening element according to FIG. 5 with a pair of wrongly attached locking washers.

Figure 7:
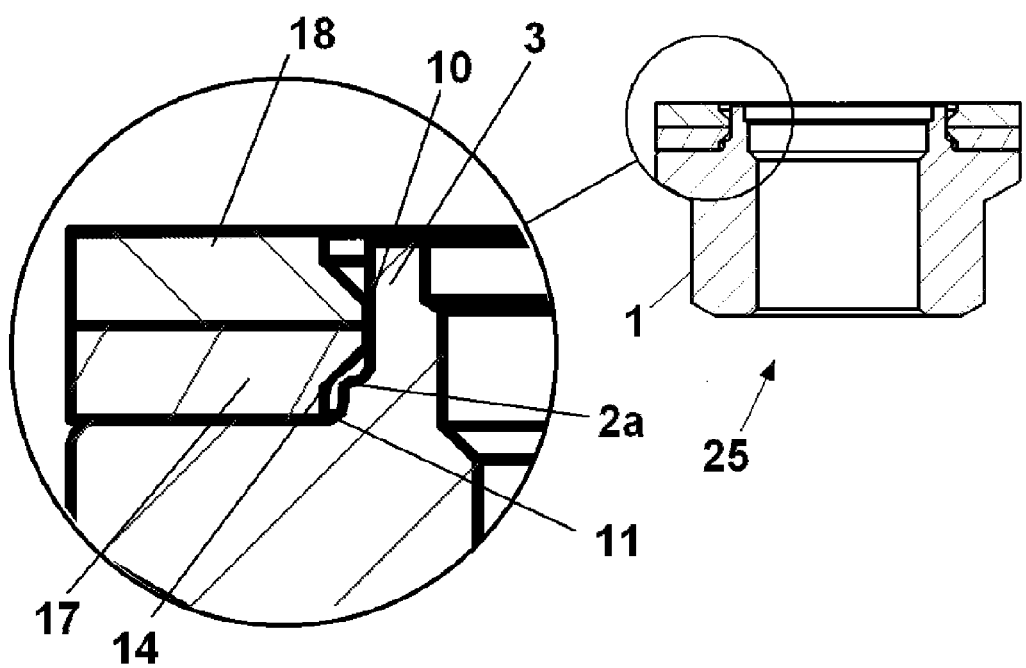
Figure 7A:
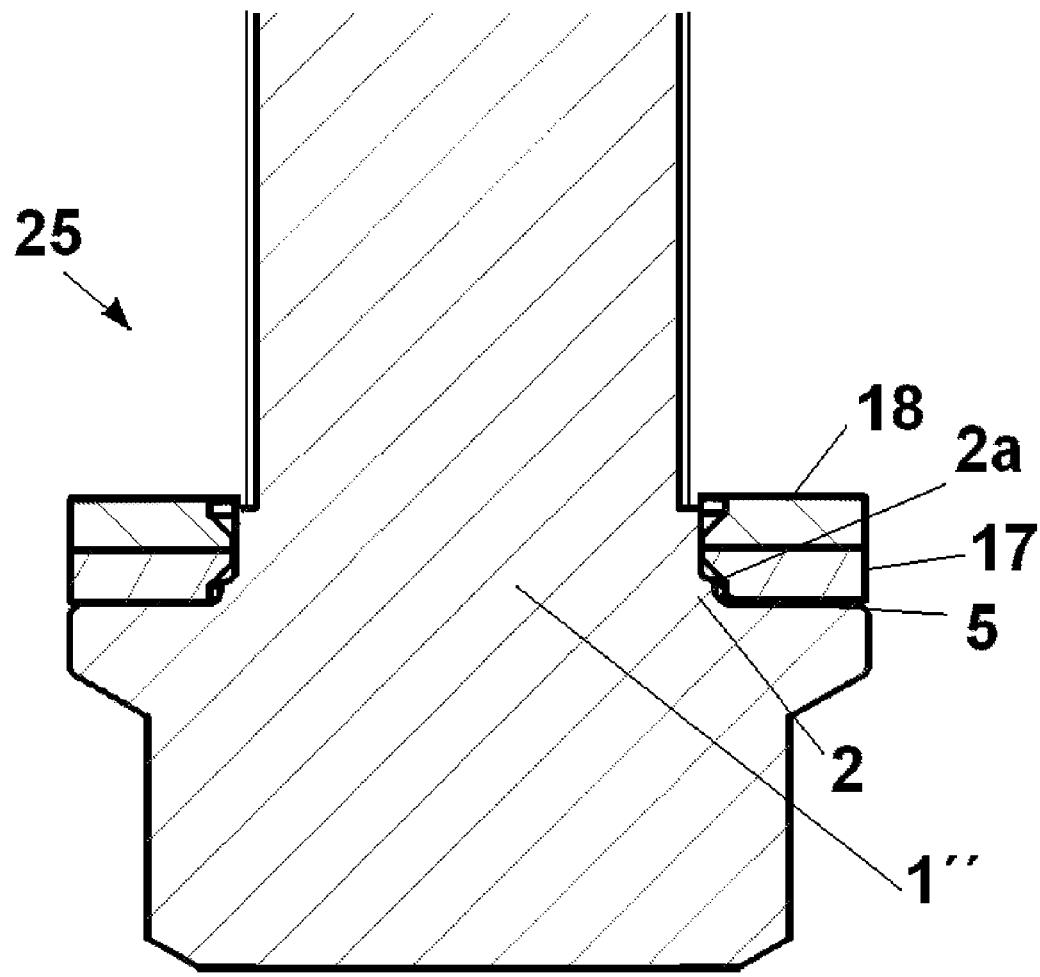
Figure 8:
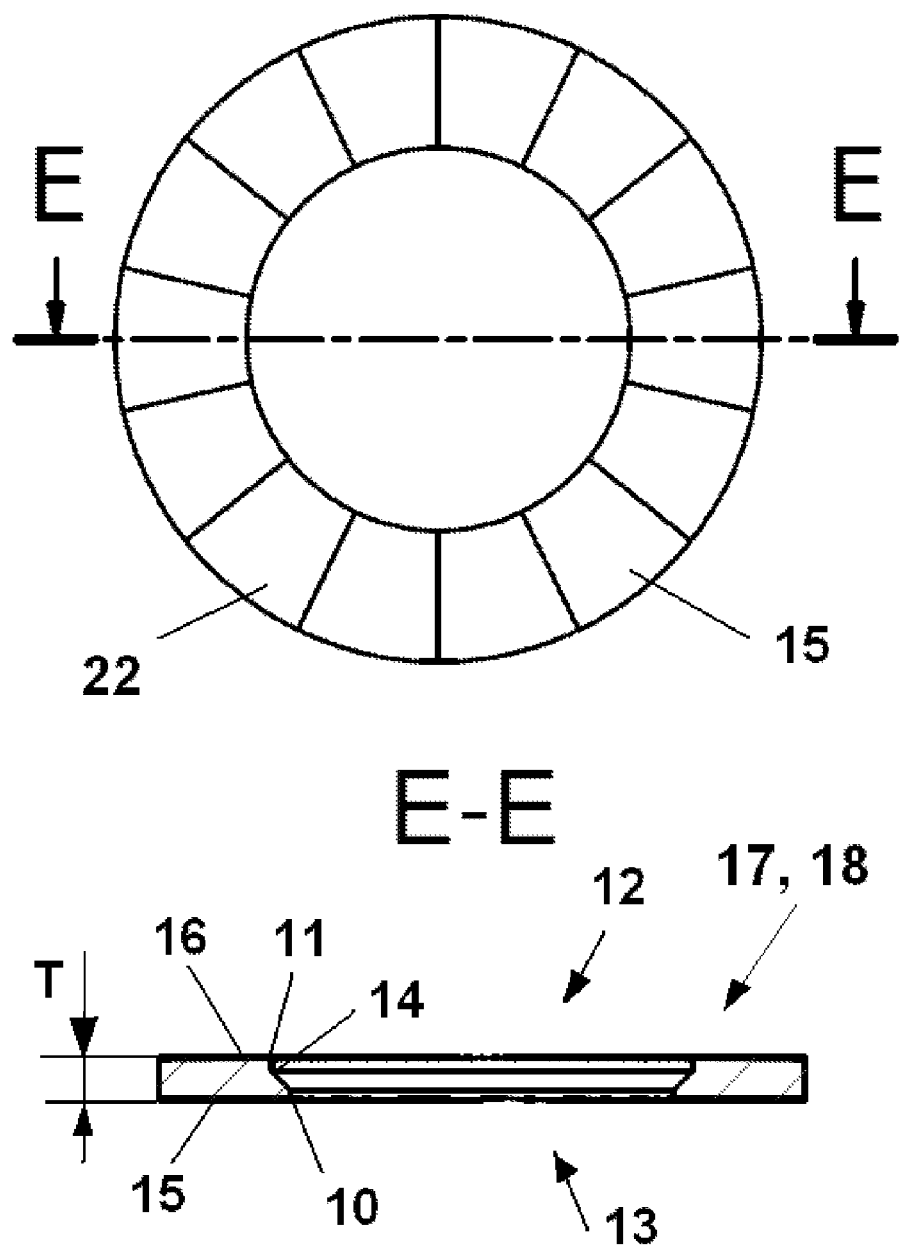

FIG. 7 discloses a fastening assembly with a pair of correctly attached locking washers, the fastening element being a nut.
FIG. 7a discloses a fastening assembly with a pair of correctly attached locking the fastening element being a screw.
FIG. 8 discloses a locking washer comprising cams.

DETAILED DESCRIPTION

FIGS. 1 and 2 discloses prior art of locking washers 32a, 32b used in pair. FIG. 1, discloses a locking washer pair 32a, 32b having a bevel face 30, or if this wording is preferred a chamfer. The locking washers general comprises engagement means in the form of teeth 31 on one side and engagement means in the form of cams 33 on the other side. The locking washers 32a, 32b are intended to be used in a pair and are in general exact copies of each other. In general the only difference between the locking washer 32a and 32b is that they are turned opposite to each other.

FIG. 1a discloses the function of the teeth 31 and the cams 33. The teeth 31 engage with the fastening elements head and with the work piece to be attached 34. The fastening element 36, in this case a screw, has a thread that engages with a threaded element 35. The pitch angle $\beta$ of the thread is always smaller than the wedge angle $\alpha$ of the cams of the locking washers. Thus when unscrewing the fastening element the cams 33 of the respective locking washer 32a, 32b will slide against each other and due to the pitch difference they will seek to expand the joint more than the expansion due to the thread. With this configuration the joint is locked firmly.

The teeth 31 can have any general configuration in order to be able to engage. The shown configuration is a leaning pyramidal shape where the leaning teeth 31 engage with their steeper side to the head of the screw 34 or work piece 35. Other configurations of the teeth 31 are thinkable. For example the teeth 31 could have configuration with a homogenous pyramidal shape. The teeth 31 can also have a trapezoidal shape. It is important that the teeth 31 have a hardness that is superior the screw head and the work piece 35. The reason for this is that the teeth 31 must be able to engage with the material they are positioned adjacent, in order to achieve a locking function. Otherwise the teeth could be flattened by the momentum when tightening the joint, or slide on a harder adjacent surface. Thus the locking washer 32a is moved with the fastening element 36 when tightening the joint and the locking washer 32b is kept still on the work piece 35.

The cams 33 can be described as wedges see FIG. 2 as an example of this. The cams 33 generally have a steeper surface and an inclined surface. The respective locking washer 32a, 32b can thus when being tightened to each other have their respective cams 33 positioned adjacent each other. Locking is achieved by the wedge shape of the cams 33. When the tightened the fastening element 36 is being unscrewed for example by vibrations or a user, the teeth 31 of the locking washers 32a, 32b engage with the fastening element's head and the element 35 that has been attached. Thus the locking washer 32a is seeking to follow the motion in the turning direction of the fastening element 36 and the other washer 32b is seeking to be maintained in position by its respective teeth 31 engaged with the work piece 16. The cams 33 slide on each other, on their inclined surface, thus seeking to extend the screw joint in the longitudinal direction of the fastening element 36, by means of the inclination, wedge angle $\alpha$, of the cams surface when sliding in the untightening direction. This extension locks the joint and prevents the fastening element from untightening. Thus the cams 33 prevent the locking washers 32a, 32b from being moved in the untightening direction of the screw.

The difference between teeth 31 and cams 33 can in general be described in that the teeth are not designed to interact with another serrated surface, where as the cams 33 is intentionally intended to cooperate with each other on the respective locking washer. And the cams 33 should have a wedge angled of particular configuration as above and as seen in FIG. 1a. And further the teeth should have the ability to prevent the washer from sliding against the surface the teeth are applied against. In preference the teeth should engage the surface they are applied against such that when unscrewing a joint the steep surface of a non homogenously shaped tooth should be in the opposite direction of unscrewing. This means that the steep surface of a tooth should be in the opposite direction of unscrewing. This is the opposite of the cams, which should always have their steep surface in the direction of unscrewing.

FIG. 3 discloses a first embodiment of the fastening element 1, in the form of a nut. The nut is generally provided with a hexagonal head section 6, such that it can be engaged with a tool, for example a wrench. I should be understood that the hexagonal shape is not mandatory. A screw for an Allen key with a hexagonal socket is also thinkable as well as other similar configurations, such as Torx®. Further the nut has a first end 7 and a second end 8. The first end is provided with a protruding cylindrically shaped section 3. The cylindrically shaped section 3 extends from a surface 5 on a flanged section 4 of the nut. The cylindrical section 3 is provided to the nut in order to guide a locking washer 17, 18 see FIG. 8 that is to be used with the nut 1. At the transition between the cylindrically shaped section 3 and the surface 5 of the flanged section 4, there is provided an engaging section 2. The engaging section 2 can be shaped as having a flat surface 2b transversal to the centre-line of the nut 1, as in FIG. 3. A steeper side 9 of the engagement section 2 links this section to the surface 5 of the flanged section 4. It is mandatory for the engaging section 2 to have a larger diameter than the cylindrical section 3 at least at a first portion 2a. The engaging section 2' can of course have other shapes in order to meet the object of the present invention, for example it can have a bevel face shape as seen in FIG. 4. In FIG. 4 the engaging section 2' the bevel face extends at an angle from the cylindrical section 3 to the surface 5 of the flanged section 4. The meaning of bevel face should be construed broadly, meaning a leaning surface. The first portion 2a' on a bevel faced engagement section 2' will be an imaginary point where a wrongly mounted locking washer comes into contact with the bevel face engagement section 2'.

The cylindrically shaped section 3 has a function to also in addition for guidance of the locking washers 17, 18 to be applied, see FIG. 8. The additional function of the cylindrically shaped section is in particular with the nut 1 embodiment, to retain the washers 17, 18 on the nut. In general a normal nut will not retain or hold any washers. But by providing the cylindrically shaped section 3, the washers can be retained on the nut 1. Thus the nut and the locking washers 17, 18, can be provided to the user as a unit, with the washers mounted on the nut 1 via the cylindrically shaped section 3. But more important, when the user is to apply locking washers 17, 18 to a joint, he can first apply the washers to the nut 1, thus not needing to hold them in place on the nut, when assembling the parts to be attached together.

In FIG. 3a a comparison can be seen between the fastening element according to the prior art to the left and a fastening element 1 according to the first embodiment to the right. FIG. 3 above is a cross section of the fastening element to the right in FIG. 3a.

Even if the description above discusses a nut 1 it should be understood that it is possible to design a screw or a threaded bolt 1' in the same manner for achieving the object of the invention. An example of this is disclosed in FIG. 5 where a threaded bolt or screw is disclosed. The thread 21 being disclosed on the shank 20 of the screw. All other features of the screw 1" remains the same as with the previous examples of a nut 1 with a flat surfaced engaging section 2 and a nut 1' with a bevel faced engaging section 2. It should be understood that the diameter of the tread 21 is smaller than that of the extending section 3 of the screw 1".

FIG. 6 discloses a fastening assembly 25 with the nut 1 as described above and further having a first and a second locking washer 17, 18. The first locking washer 17 has been mounted in the wrong direction. Thus the first locking washer 17 is resting with a first diameter 10 against the flat surface of the engaging portion 2 of the nut 1. This giving rise to a gap 19 that prevents the surface 15 of the locking washer 17 from reaching the surface 5 of the flanged section 4 of the nut. This gap 19 corresponds to the distance 9 that will occur when the locking washer 17 is mounted with the wrong end 13 towards the surface 5 of the flanged section 4 of the fastening element 1, 1', and 1". The second washer 18 is applied correctly in this FIG. 6. But as the first washer 17 has been mounted with its cams 22 in the wrong direction, no wedge locking effect can occur. FIG. 6a discloses the exact same fastening assembly 25 but for a screw 1".

FIG. 7 discloses the locking washer assembly 25 according to FIG. 6 when the locking washer 17 has been mounted in the correct manner. In this configuration the locking washer 17 is able to be positioned adjacent the surface 5 of the flanged section 4 of the nut 1. This is due to the fact that the second diameter 11 of the washer 17 is larger than the diameter of engaging section 2, thus the washer 17 is able to house the engaging section without essentially contacting it. The second washer 18 has the same position as in FIG. 6. In general the cams 22 of the washers 17, 18 are in contact in the interface between the two disclosed washers 17, 18. FIG. 7a applies for a correct arrangement of a screw 1", all common features in common with the disclosure of a fastening assembly according to FIG. 7.

It is thus a particular relation between the first 10 and second 11 diameter of the locking washer 17, the thickness T of the washer, the distance between the first portion 2a of the engaging section 2 and the surface 5 of the flanged section, such that, when said locking washer is applied to the cylindrical section 3 of the fastening element with the second diameter facing the surface 5 of the flanged section 5, the second end surface of the washer can be positioned in parallel contact with the surface 5 of the flanged section 4, thus when the washer is applied in this direction, the first portion 2a of the engaging section 2 has a smaller diameter than a point in the axial direction of the washer on the inside periphery, facing the first portion 2a of the engaging section 2. That is a point on the periphery of the inside hole of the washer which ends up facing the first portion 2a, when the washer rests upon the face 5 of the flanged section 4, has a larger diameter than the first portion 2a. Thus the first portion 2a cannot obstruct the introduction of the washer 17 if placed in the right direction on the cylindrical portion 3. And further the thickness T of the washer 17 should allow for this, thus the first portion 2a should not be at a larger distance from the surface 5 of the flanged section than the thickness T of the washer 17.

A washer 17, 18 of the fastening assembly 25 is disclosed in FIG. 8, disclosing the first diameter 10 smaller than the second diameter 11. In general the smaller diameter 10 is positioned on the same end side 12 as the cams 22 of the washer 17, 18. On the other side is generally friction engaging means positioned, in general in the form of teeth as described above together with FIG. 1-2.

The flanged section 4 should be understood to be of a size compared with the head section 6 that can differ from the FIGS. 3-7, of the above discussed different designs. It should be understood that the flanged section is applied in order to increase the surface 5 of the fastening element 1, 1', 1" that can engage a locking washer. But thus in general the flanged section 4 has a diameter that is larger than a diameter of the smallest peripheral circle to the head section 6, seen in the axial direction of the nut. But when applications so requires the flanged section could have the same diameter as a circle drawn touching all the corners of a hexagonal head section, or a circle which equals a head section 6 where the head section is round.

Axial direction of the above fastening elements should be understood as the direction in which the central hole of a nut or the shank of a screw extends. Thus for example in FIGS. 3 and 5 axial direction extends from the first end 7 to the second end 8.

Other configurations of the engaging section 2 is thinkable within the scope of the invention, thus for example the engaging section 2 need not be circumferal to the nut or the screw. It can be constituted of sections of protruding engaging section units that circumfer the nut or the screw, but with sections where there engaging section is not present.

With regard to the extension of the cylindrically shaped section 3 of the nut 1, 1' it should be understood that FIG. 7 gives an example of a suitable extension of this section 3. That is that the two washers 17, 18 when correctly positioned on the nut 7 more or less have a thickness so as to be level with the extension of the cylindrically shaped section 3. It should be understood that the extension as disclosed in FIG. 7a for a corresponding screw 1" is also applicable for a nut 1'. That is the extension of the cylindrically shaped section 3 of a nut 1, 1' need not extend so as to be level with the washers 17, 18 when applied in a correct manner, but can extend shorter. But it should also be understood that the extension of the cylindrically shaped section 3 can be further than the thickness of the two washers 17, 18 when applied in a correct manner. There is a distinct order of the different sections 3, 2, 4 and 6. This order is clearly visible in for example FIG. 6a of the screw 1". And it is also clearly visible in for example FIG. 7 for a corresponding nut 1'. Also in FIG. 3 the order of the different sections can be studied.

From the drawings 5, 6a och 7a it is clear the screw 1" is a screw intended to be used with a corresponding threaded element. That means that the screw is not self-drilling.

The invention claimed is:

1. A fastening assembly comprising:
   at least two locking washers including a first locking washer and a second locking washer, and
   a nut extending along a central axis between a first end and a second end,
   said nut comprising;
   a head section extending from the second end of the nut along the central axis and engageable by a tool,
   a protruding cylindrically shaped section having a diameter smaller than a diameter of the head section
   a flanged section arranged between the head section and the protruding cylindrically shaped section, which has (a) to (c);
      (a) an outer diameter that is larger than the protruding cylindrically shaped section,
      (b) an outer diameter that is equal to or larger than the diameter of the head section,
      (c) a surface facing to the first end, being circumferential to the central axis of the nut,
   an engaging section, wherein
      (d) at least a first portion of the engaging section has an outer diameter that is larger than the outer diameter of the cylindrically shaped section,
      (e) the outer diameter of the engaging section is substantially smaller than the outer diameter of the flanged section,
      (f) the first portion of the engaging section is positioned at a distance from the surface of the flanged section,
   wherein the first locking washer is provided with a first inner diameter facing the engaging section at one axial end of the first locking washer smaller than a second inner diameter at the other axial end of the first locking washer so that the first locking washer is stopped from reaching the surface of the flanged section by engagement of the first inner diameter with the engaging section at the first portion of the engaging section when the first locking washer is introduced on the cylindrically shaped section with the first inner diameter in a direction of the engaging section,
   wherein the first locking washer comprises wedge locking cams on the first end surface, and the second locking washer comprises wedge locking cams engaging with the wedge locking cams of the first locking washer so that the engagement between the wedge locking cams of the first locking washer and second locking washer occurs a locking effect.

2. The fastening assembly according to claim 1 wherein the engaging section is provided in the form of a circular protrusion to the cylindrically shaped section.

3. The fastening assembly according to claim 1, wherein the engaging section is provided with an essentially flat upper surface and an essentially perpendicular surface extending to the surface of the flanged section.

4. The fastening assembly according to claim 1, wherein the engaging section is provided in the form of a bevel face running circumferentially around the cylindrically shaped section and extending from the surface of the flanged section to the cylindrically shaped section.

5. The fastening assembly according to claim 1, wherein the two locking washers are constituted in same manner.

6. A fastening assembly comprising:
   at least one locking washer, and
   a fastening element extending along a central axis between a first end and a second end,
   said fastening element comprising;
   a head section extending from the second end of the fastening element along the central axis and engageable by a tool,
   a protruding cylindrically shaped section having a diameter smaller than a diameter of the head section
   a flanged section arranged between the head section and the protruding cylindrically shaped section, which has (a) to (c);
      (a) an outer diameter that is larger than the protruding cylindrically shaped section,
      (b) an outer diameter that is equal to or larger than the diameter of the head section, (c) a surface facing to the first end, being circumferential to the central axis of the fastening element, an engaging section, wherein
(d) at least a first portion of the engaging section has an outer diameter that is larger than the outer diameter of the cylindrically shaped section,
(e) the outer diameter of the engaging section is substantially smaller than the outer diameter of the flanged section,
(f) the first portion of the engaging section is positioned at a distance from the surface of the flanged section, such that the locking washer is provided with a first inner diameter facing the engaging section at one axial end of the locking washer smaller than a second inner diameter at the other axial end of the locking washer is stopped from reaching the surface of the flanged section by engagement of the first inner diameter with the engaging section at the first portion of the engaging section when the locking washer is introduced on the cylindrically shaped section with the first inner diameter in a direction of the engaging section, wherein the surface of the flanged section facing the first end is provided with cams for engaging a wedge locking washer with corresponding cams.

7. A fastening assembly comprising:
at least two locking washers including a first locking washer and a second locking washer, and
a nut extending along a central axis between a first end and a second end,
the nut comprising;
  a head section extending from the second end along the central axis,
  a cylindrically shaped section having a diameter smaller than a diameter of the head section,
  a flanged section between the head section and the cylindrically shaped section, which has (a) to (c);
    (a) an outer diameter being larger than the diameter of the cylindrically shaped section,
    (b) an outer diameter being equal to or larger than the diameter of the head section,
    (c) a surface facing to the first end, being a circular shape to the central axis of the nut,
  an engaging section comprising a first portion, which has an outer diameter being larger than the outer diameter of the cylindrically shaped section, wherein the outer diameter of the engaging section is substantially smaller than the outer diameter of the flanged section, and the first portion is provided with a distance from the surface of the flanged section,
wherein the first locking washer comprising;
  a first inner diameter at a first end surface,
  a second inner diameter at a second end surface opposite the first end surface,
wherein the first inner diameter is smaller than the second inner diameter, and the first locking washer stops before reaching the surface of the flanged section by engagement of the end surface having the first inner diameter with the engaging section at the first portion when the first locking washer is introduced around the cylindrically shaped section,
wherein the first locking washer comprises wedge locking cams on the first end surface, and the second locking washer comprises wedge locking cams engaging with the wedge locking cams of the first locking washer so that the engagement between the wedge locking cams of the first locking washer and second locking washer occurs a locking effect.

* * * * *